US011001307B2

(12) United States Patent
Steffens et al.

(10) Patent No.: US 11,001,307 B2
(45) Date of Patent: May 11, 2021

(54) MOTOR VEHICLE B-PILLAR

(71) Applicant: Muhr und Bender KG, Attendorn (DE)

(72) Inventors: Hubertus Steffens, Drolshagen (DE); Bernhard Spielvogel, Moosbach (DE)

(73) Assignee: Muhr und Bender KG, Attendorn (DE)

( * ) Notice: Subject to any disclaimer, the term of this patent is extended or adjusted under 35 U.S.C. 154(b) by 97 days.

(21) Appl. No.: 16/423,394

(22) Filed: May 28, 2019

(65) Prior Publication Data

US 2019/0367095 A1 Dec. 5, 2019

(30) Foreign Application Priority Data

Jun. 1, 2018 (DE) .......................... 102018113141.0

(51) Int. Cl.
| | |
|---|---|
| *B62D 25/04* | (2006.01) |
| *B62D 21/15* | (2006.01) |
| *B62D 25/06* | (2006.01) |
| *B62D 29/00* | (2006.01) |

(52) U.S. Cl.
CPC ........... *B62D 25/04* (2013.01); *B62D 21/157* (2013.01); *B62D 25/06* (2013.01); *B62D 29/001* (2013.01)

(58) Field of Classification Search
None
See application file for complete search history.

(56) References Cited

U.S. PATENT DOCUMENTS

| | | | | |
|---|---|---|---|---|
| 7,677,645 | B2* | 3/2010 | Henkelmann | B62D 29/001 296/187.12 |
| 10,538,686 | B2* | 1/2020 | Voigt | C09J 5/00 |
| 2011/0101734 | A1* | 5/2011 | Gunther | B62D 29/001 296/193.06 |
| 2014/0145469 | A1* | 5/2014 | Mildner | B62D 27/026 296/193.06 |
| 2015/0123419 | A1* | 5/2015 | Werum | B62D 25/087 296/24.43 |
| 2016/0229457 | A1* | 8/2016 | Boettcher | B62D 29/005 |
| 2016/0297479 | A1* | 10/2016 | Ritschel | B62D 25/025 |
| 2017/0166261 | A1* | 6/2017 | Memili | B62D 29/005 |
| 2017/0327157 | A1* | 11/2017 | Jaunasse | B62D 29/004 |

(Continued)

FOREIGN PATENT DOCUMENTS

| | | |
|---|---|---|
| DE | 102006027546 A1 | 12/2007 |
| DE | 102011100050 A1 | 10/2012 |
| DE | 102012207901 A1 | 11/2013 |

(Continued)

*Primary Examiner* — Lori L Lyjak
(74) *Attorney, Agent, or Firm* — Bejin Bieneman PLC (57) ABSTRACT

A B-pillar for a motor vehicle body extends along a longitudinal axis, and comprises an upper metal portion for connecting the B-pillar to a roof area of the motor vehicle body and a lower metal portion for connecting the B-pillar to a sill area of the motor vehicle body; and a fiber composite component comprising fibers and a plastic matrix, the upper metal portion comprising an upper region for force introduction, and the lower metal portion comprising a lower region for force introduction being axially spaced from the upper region for force introduction, the upper region for force introduction and the lower region for force introduction being embedded into the fiber composite component.

17 Claims, 4 Drawing Sheets

(56) References Cited

U.S. PATENT DOCUMENTS

2018/0065681 A1\* 3/2018 Steffens .................. B62D 25/04
2019/0315411 A1\* 10/2019 Fischer .................. B62D 21/03

FOREIGN PATENT DOCUMENTS

| DE | 102012023653 A1 | 5/2014 |
| --- | --- | --- |
| DE | 102013106070 B3 | 7/2014 |
| DE | 102013200677 A1 | 7/2014 |
| DE | 102015203644 A1 | 9/2016 |
| DE | 102015115439 B3 | 1/2017 |
| DE | 102016116787 B3 | 10/2017 |
| EP | 3138685 A1 | 3/2017 |

\* cited by examiner

MOTOR VEHICLE B-PILLAR

CROSS-REFERENCE TO RELATED APPLICATIONS

This application claims priority to German Application No. DE 10 2018 113 141.0, filed on Jun. 1, 2018, which application is hereby incorporated herein by reference in its entirety.

BACKGROUND

From EP 3 138 685 A1 a motor vehicle B-pillar is known which has a metallic base body that is reinforced with a fiber composite material in areas of local load maxima. In the locally reinforced areas of the B-pillar, the load acting on the B-pillar thus is carried by a multi-layer composite of metal and fiber composite material.

DE 10 2006 027 546 A1 discloses a multi-shell B-pillar made of sheet metal formed parts, wherein the B-pillar is locally reinforced in the middle area of the B-pillar with an impact protection reinforcing part to protect the occupants in the event of a side impact. The reinforcing part consists of a fiber composite material.

From DE 10 2012 023 653 A1 a B-pillar with an inner closing plate made of a flat sheet metal blank is known, onto which a lightweight component made of fiber-reinforced plastic is mounted from the outside. The fiber composite part extends across the entire length of the inner closing plate.

SUMMARY

A B-pillar for a motor vehicle body is described extending along a longitudinal axis and comprising an upper metal portion for connecting the B-pillar to a roof area of the vehicle body and a lower metal portion for connecting the B-pillar to a sill area of the vehicle body and a fiber composite component. A motor vehicle body can include such a B-pillar. A weight-reduced B-pillar that fulfils demanding crash load cases can thus be provided, as can a weight-reduced motor vehicle body that can cope with demanding crash load cases.

A B-pillar of the above-mentioned type can be provided in which the upper metal portion comprises an upper region for force introduction and the lower metal portion comprises a lower region for force introduction axially spaced from the upper region for force introduction, wherein the upper region for force introduction and the lower region for force introduction are embedded into the fiber composite component.

The B-pillar is a load-bearing vehicle pillar of a motor vehicle body. When reference is made to a "built-in condition", this refers to the condition in which the ready-to-operate B-pillar is built in the vehicle body between the roof area and the sill area. Terms such as "lower", "upper" or "central" refer to spatial information with respect to the B-pillar in the built-in condition at the motor vehicle body. The length of the B-pillar corresponds to the length of the course of a centerline of the B-pillar, which extends from a lower edge of the B-pillar to an upper edge of the B-pillar. Usually, the centerline is a linear longitudinal axis of the B-pillar, whereby the centerline can also be curved when the B-pillar is curved.

The B-pillar is a hybrid metal-fiber composite column of integral construction. The advantage is that the hybrid B-pillar can be integrated into the metallic motor vehicle body by means of conventional joining techniques, for example by using conventional welding processes. Another advantage is that areas of the B-pillar that do not serve to connect the B-pillar to motor vehicle body components can be replaced by the fiber composite component that are lighter in weight compared to metallic materials. Thus, the fiber composite component fills areas in which the metallic material is recessed. Said recessed areas can be completely filled out by the fiber composite component This means that the fiber composite component is not used in the form of local patches to reinforce a metallic basic body of the B-pillar. Rather, a doubling of material, which is caused by an overlap of metal sections with the fiber composite component, is only necessary insofar as an permanent connection between the two connecting partners, namely the fiber composite component and the metal section, is to be ensured in the respective regions for force introduction.

Since the upper region for force introduction of the upper metal portion and the lower region for force introduction of the lower metal portion are embedded into the fiber composite component, the plastic matrix of the fiber composite component serves as an adhesive which inseparably bonds the upper metal portion and the lower metal portion to the fiber composite component. Embedded in this context means that the respective metal portion is enclosed by a C-shaped section of the fiber composite component when viewed in section through the B-pillar. Thus, the fiber composite component rests on three sides of the respective metal portion.

The fiber composite component comprises the plastic matrix and the fibers bound in the matrix. In a known manner, the fibers transmit the force within the fiber composite component and the matrix fills out gaps between the fibers and transfers the external forces into the fibers. The plastic matrix can be a thermoplastic matrix or a duroplastic matrix. The fibers may include, for example, carbon and/or glass and/or aramid fibers.

The metal portions are joined to the fiber composite component before the matrix cures or solidifies. Hence, the metal portions are joined to the fiber composite component during the manufacture of the fiber composite component. For this purpose, the fiber composite material can be joined to the metal portions by hand, semi-automatically or mechanically, for example, by a laminating, spraying, pressing or injection process, or by any other process suitable for joining metal to fiber composite material. Once the matrix has cured or solidified, the fiber composite component and the metal portions are permanently connected to each other and form an integral hybrid component in the form of the ready-to-use B-pillar. "Permanently connected" in this context means that the fiber composite component adheres immovably to the metal portions. If the fiber composite component is detached from the metal portions, for example due to a side impact caused by an accident, the B-pillar is destroyed.

The upper and/or lower metal portions can be made of steel sheet. The steel sheet can be a cold-formed steel, for example a high-strength steel, for example a dual-phase steel. Both the upper metal section and the lower metal section can be made of cold-formed steel. However, the upper metal portion and/or the lower metal portion can also be made of magnesium sheet or aluminum sheet.

Further, the upper metal portion may comprise an upper end edge and/or the lower metal portion may comprise a lower end edge. The fiber composite component may extend with an upper end portion across the upper end edge into the upper region for force introduction and/or with a lower end portion across the lower end edge into the lower region for force introduction. The respective metal portion ends along its end edge, so that an area of the B-pillar adjoins beyond the respective end edge, in which the respective metal portion is virtually recessed. The resulting recess can be at least partially filled by the fiber composite component to load the bearing of the B-pillar in this area. Because the fiber composite component extends beyond the respective end edge into the respective region for force introduction, the fiber composite component embraces the respective metal portion in a C-shape when viewed in longitudinal section through the B-pillar. This results in a stable integration of the fiber composite component into the force flow of the B-pillar.

The fiber composite component may be formed as an integral component that is coherent in itself. In this way, the fiber composite component performs a structure-bearing function within the B-pillar. In this way, more than 50% of the load applied to the built-in B-pillar along a longitudinal portion of the B-pillar defined between the upper metal portion and the lower metal portion can be carried by the fiber composite component as it is integral in the force flow of the B-pillar.

To provide a particularly light in weight B-pillar in which the ratio between composite fiber component and metal portions is as large as possible, the composite fiber component may extend across at least 0.25 times a total length of the B-pillar, for example between 50% and 90% of the total length of the B-pillar. Furthermore, a distance between the upper end edge of the upper metal portion and the lower end edge of the lower metal portion may be at least 25% of the total length of the B-pillar and/or at most 95% of the total length of the B-pillar. Another advantage is that the fiber composite component is thus located in a central area of the B-pillar, which is usually configured to be high-strength to protect the occupants. The fiber composite component may have a lower elongation at break compared to the metallic material of the metal portions, but remains elastic to a certain degree when a load is applied, for example in the event of a side impact, and can thus elastically yield. As long as the elongation at break of the fiber composite component is not exceeded, it returns to its original form after load application. This advantageous movement of the fiber composite component can also be described as "breathing".

A lower end of the fiber composite component, for example a lower end edge of the fiber composite component, may be spaced from a lower end of the B-pillar, for example a lower end edge of the B-pillar at a distance of at least 10 cm (centimeters), for instance between 10 cm and 60 cm. In this way, the B-pillar may be joined to the sill area of the vehicle body only via the lower metal portion allowing to use standard joining methods to connect the B-pillar to the metal sill area. Due to the spacing of the fiber composite component from the sill area, a deformation zone can be provided by the lower metal portion, especially in a door entry area, allowing plastic deformation in the event of a crash. Alternatively or in addition to the spacing of the fiber composite component from the lower end of the B-pillar, an upper end of the fiber composite component, for example an upper end edge of the fiber composite component, may be spaced from an upper end of the B-pillar, for example an upper end edge of the B-pillar, at a distance of at least 5 cm, for example at a distance of between 5 cm and 40 cm. Hence, the B-pillar may be joined to the typically metal roof area of the vehicle body only via the upper metal portion. As a result, the integration of the B-pillar into the vehicle body is simplified because the fiber composite component is only connected to the metal portions of the B-pillar and, when the B-pillar is installed, only the metal portions are connected to the vehicle body parts, for instance by using conventional joining techniques.

The upper metal portion and/or the lower metal portion may each have at least one lateral joining flange at least in sections for connecting components adjacent to the B-pillar to the B-pillar. The at least one lateral joining flange may project laterally beyond the fiber composite component. By this the other components, such as a door seal and/or a vehicle outer skin and/or a glass surface, may solely be connected to the respective metal portions, so that conventional joining techniques can also be used here.

According to a first option, it may be provided that the upper metal portion and the lower metal portion are separate sheet metal formed parts which are joined together via the fiber composite component only. Thus the upper metal portion may be used to connect the B-pillar to the roof area of the vehicle body and the lower metal portion may be used to connect the B-pillar to the sill area of the vehicle body and, if necessary, to provide a deformation zone in the door entry area of the vehicle body. Thus, the two sheet metal formed parts are spaced from each other, so that the load-bearing function of the B-pillar in this spaced area of the B-pillar is carried out only by the fiber composite component.

To further strengthen the bond between the respective metal portion and the fiber composite component, the region for force introduction of the upper metal portion and/or the region for force introduction of the lower metal portion may be U-shaped in a longitudinal sectional view through the B-pillar. This further strengthens the inseparable bond between the fiber composite component and the respective metal portion.

In addition to the embedded connections in the regions for force introduction or as an alternative to said embedded connections it may be possible that either the upper or lower metal portion comprises joining areas in which the upper or lower metal portion rests only on one side on the fiber composite component and is connected to the fiber composite component by means of known joining processes, for instance by adhesive rivets or screws.

According to a second option which may be an alternative to the aforementioned first option with the upper metal portion and the lower metal portion configured as separate sheet metal formed parts, the B-pillar may comprise a sheet metal formed part extending along the longitudinal axis of the B-pillar. Said sheet metal formed part may comprise the upper metal portion and the lower metal portion, wherein the sheet metal formed part comprises at least one material recess between the upper end edge of the upper region for force introduction and the lower end edge of the lower region for force introduction. Said material recess may be at least partially filled by the fiber composite component. The sheet metal formed part may extend across the entire length of the B-pillar. The at least one recess may be formed within the sheet metal formed part so that the regions for force introduction in a section plane through the B-pillar are enclosed from four sides. Said section plane may run parallel to the longitudinal axis. Thus, a particularly stable connection between the fiber composite component and the sheet metal part is provided. In some aspects of the present disclosure the at least one recess may be configured open towards at least one side.

Furthermore, the sheet metal formed part can have at least in sections at least one lateral joining flange for connecting components adjacent to the B-pillar to the B-pillar. The at least one lateral joining flange may project laterally beyond the fiber composite component. By this, the sheet metal formed part serves as the sole connecting partner for components adjacent to the B-pillar when installed, such as a door seal and/or a vehicle outer skin and/or a glass surface and, of course, the sill area and the roof area of the vehicle body.

With regard to all options described above, the lateral joining flanges can be single-layered. This means that one side edge of the fiber composite component is spaced from one side edge of the joining flange such that the joining flange forms a single-layered flange section for connecting adjacent components to the B-pillar. Thus, the components, which in the built-in condition are adjacent to the B-pillar, can be joined to the metallic joining flange by means of standard joining processes, for example by welding or gluing. The fiber composite part therefore does not have to be connected to the adjacent components. The B-pillar may have several external joining flanges, for instance two spaced-apart flanges, which extend at least in sections along the longitudinal axis of the B-pillar. In order to further reduce the weight of the B-pillar, at least one joining flange can be specifically cut out in defined longitudinal sections of the B-pillar in which no connection of adjacent components to the B-pillar in its built-in condition is required. However, it is also conceivable and possible that laterally projecting metal joining flanges are embedded into the fiber composite component for the lateral connection of the adjacent components. This can be advantageous when the B-pillar comprises said two spaced sheet metal formed parts forming the upper metal portion and the lower metal portion.

Furthermore, between the upper region for force introduction and the lower region for force introduction the B-pillar can be at least partially U-shaped such that a cavity for accommodating vehicle add-on parts is formed on an inner side of the B-pillar. The U-shaped section may be formed by the fiber composite component. Accordingly, the fiber composite component can have at least two side webs in sections and a central web connecting the two side webs in a U-shape. Functional parts such as the lateral metal joining flanges can be embedded in the side webs. Due to the overall shell-shaped design, the fiber composite component can withstand higher lateral forces acting on the B-pillar, which can occur, for example, in the event of a side impact. On the other hand, vehicle attachments or add-on parts such as a front door wedge and/or door latch and/or door hinge and/or rear door latch and/or belt pulley and/or belt tensioner can be accommodated in the resulting cavity and, if necessary, attached to the fiber composite component. The U-shaped cavity opens in the direction of a passenger compartment of the vehicle body so that the central web of the fiber composite component is located on the outside, i.e. on a side of the B-pillar facing away from the passenger compartment. Thus, at least one central web area of the B-pillar may be formed at least in sections solely by the fiber composite component. Furthermore, the fiber composite component may also have a hat profile, at least in sections. Thus, the fiber composite component may have two lateral flanges adjoining the side webs to enlarge the joining surfaces with the respective metal portion and the longitudinally extending sheet metal formed part comprising the two metal portions of the B-pillar.

To further optimize the crash behavior of the B-pillar, the fiber composite component can be adapted to customer specifications and the required crash properties by axial or multiaxial alignment of the fibers. In addition to the orientation of the fibers, the crash behavior can also be adapted in sections by selecting suitable materials for the fibers and/or by locally varying wall thicknesses, which can be changed, for example, by varying the number of fiber layers. Furthermore, the concentration of fibers in the fiber composite component can also be varied locally. In some aspects of the present disclosure the fiber composite component may comprise areas in which no fibers are present.

In one example, at least one metallic reinforcing insert can be embedded into the fiber composite component for local reinforcement of the fiber composite component. The at least one reinforcing insert can be completely embedded into the fiber composite component in section view through the B-pillar. The at least one reinforcing insert can be a metallic sheet metal part which, for example, can be integrated into the fabric structure of the surrounding fiber material layers of the fiber composite component in a form-fitting, load-bearing manner by braiding in fiber strands. The reinforcing insert, as well as the regions for force introduction of the metal portions, can be integrated into the matrix in a load-bearing manner due to their surface condition and roughness, respectively, and/or a surface coating concept. The at least one reinforcing insert may be made of high strength, higher strength or ultra high strength steel that is cold formed or hot formed. Furthermore, at least one reinforcing insert can have a variable thickness or variable wall thickness, respectively. The at least one reinforcing insert can optimally absorb the compressive stresses within the fiber composite component that may occur in the event of a crash and, thus, can improve the properties of the fiber composite component in terms of tensile strength.

Between the fiber composite component and the metal parts for instance the metal portions or the at least one reinforcing insert that are integrated into the matrix, a barrier or decoupling layer, for example made of an adhesive, can be provided in order to prevent contact corrosion between the metal components and the fiber composite component.

Furthermore, at least one of the sheet metal parts integrated in the B-pillar may have a variable wall thickness over the length of the B-pillar. In this way, the load-bearing capacity of the B-pillar can be adjusted locally. For example, the B-pillar can be tailored to customer-specific functional targets for different zones of the B-pillar (roof connection, flex zone in the middle/upper pillar zone, deformation zone in the foot area, sill connection zone). This tailoring may happen in interaction with the fiber composite component. For example, sheet thicknesses can vary between 0.7 mm (millimeters) and 4.5 mm. For instance, the upper metal portion and/or the lower metal portion may have a sheet thickness of 1 mm to 4 mm. In contrast, an optionally metallic central portion connecting the upper and lower metal portions may have a much thinner sheet thickness, for instance in a range from 0.7 mm to 2 mm, since the main load of the B-pillar in the central area can be carried by the fiber composite component.

In order to provide a particularly lightweight B-pillar with a small number of components between the regions of force introduction of the upper and lower metal sections, the fiber composite component may not be covered by any load-bearing structural elements of the B-pillar. Only smaller components, for instance sheet metal parts supporting or connecting vehicle attachments, can be arranged on the outside of the ready-to-use B-pillar facing away from the vehicle interior and/or can be embedded into the fiber composite components. The B-pillar may not have an inner plate, which is also referred to as a closing panel. Thus, the B-pillar can be of so-called "open design". By this, the B-pillar may only have single-layered connection points, namely the upper metal portion and the lower metal portion and optionally lateral joining flanges. Thus, the connection of the B-pillar to the vehicle body is simplified as conventional joining techniques can be used to built-in the B-pillar. In some aspects of the present disclosure the B-pillar may also comprise such an inner plate.

A further solution to the above-mentioned problem is achieved by a motor vehicle body having two of the B-pillars described above. The vehicle body provides the same advantages as described above in connection with the B-pillar, so that, briefly, reference can be made to the above descriptions. It is understood that all the above-mentioned embodiments of the B-pillar can be used for the vehicle body, and vice versa. Overall, the presently disclosed vehicle body is characterised by a reduced weight, and further is able to meet the requirements of demanding crash load conditions.

The outside of the B-pillar can be covered by the outer vehicle skin. After completion of the vehicle body, the outer vehicle skin is usually attached only to the vehicle body, for instance to the lateral joining flanges of the B-pillar. In order to provide an especially light weight vehicle body, the fiber composite component of the B-pillar can also be visible from the outside in the built-in condition, at least when the vehicle door is open.

SUMMARY OF THE DRAWINGS

Examples are explained below with reference made to the drawings, wherein.

DETAILED DESCRIPTION

FIGS. 1 to 9 show a B-pillar 1 of a motor vehicle body according to a first example. The B-pillar 1 comprises an elongated, hollow basic shape and extends along a longitudinal axis X. In a built-in condition, in which the ready-to-use B-pillar 1 is integrated as a load-bearing structural element in the vehicle body, the B-pillar 1 connects a roof area (not shown) of the vehicle body with a sill area (not shown) of the vehicle body.

Figure 1:
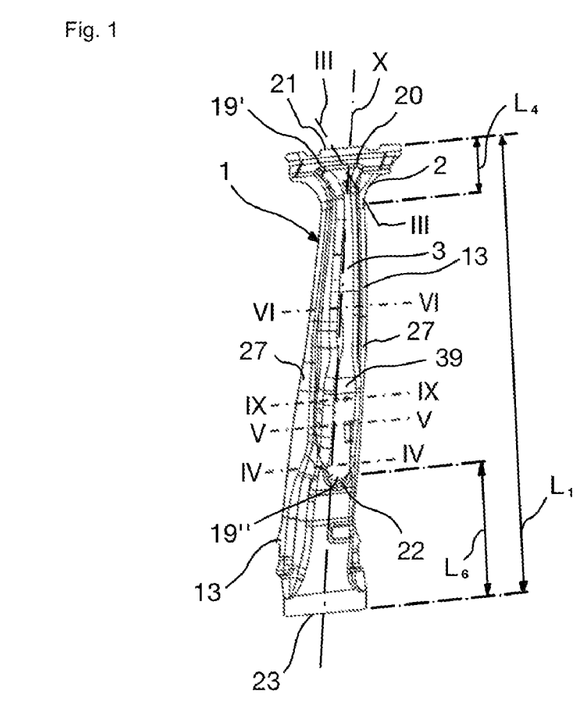
FIG. 1 shows a B-pillar according to a first example in a perspective view.

The B-pillar 1 is a hybrid component which comprises a sheet metal formed part 2 extending along the longitudinal axis X and a fiber composite component 3 permanently connected to it. FIG. 1 shows the ready-to-use B-pillar 1, which comprises a hat-shaped profile, at least in sections. The B-pillar 1 of a conventional passenger car can usually have a length $L_1$ of approximately 1.30 m to 1.50 m. The length $L_1$ of the B-pillar 1 can be between 1.30 m and 1.50 m.

Figure 2:
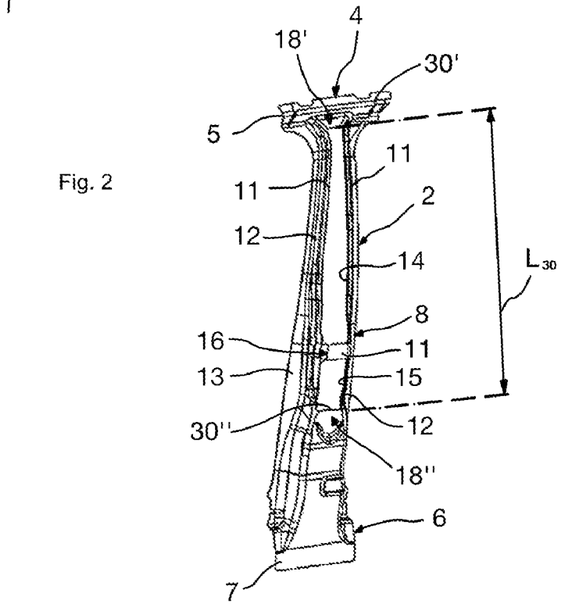
FIG. 2 shows a sheet metal formed part of the B-pillar from FIG. 1 in a perspective view.

FIG. 2 shows the B-pillar 1 in an unfinished state in which the fiber composite component 3 has not yet been manufactured. First, the sheet metal formed part 2 is produced. Only then, the fiber composite component 3 is produced, for example by applying or injection-molding a fiber composite material onto the sheet metal part 2. Regions of laminating force introduction 18 of the sheet metal formed part 2, for example may be laminated into the fiber composite material. After hardening or solidification of the matrix of the fiber composite material, the fiber composite component 3 is finished and is, then, permanently connected to the sheet metal formed part 2. The formed sheet metal part 2 and the fiber composite component 3 together form the hybrid B-pillar 1.

The sheet metal formed part 2 can be a cold-formed part, which can, for example, be made of a dual-phase steel sheet. The sheet metal formed part 2 extends over the entire length $L_1$ of the B-pillar 1 and can have a variable wall thickness or sheet metal thickness over the length $L_1$. The wall thickness can be tailored to fit customers requirements for crash zones of the B-pillar 1.

Figure 3:
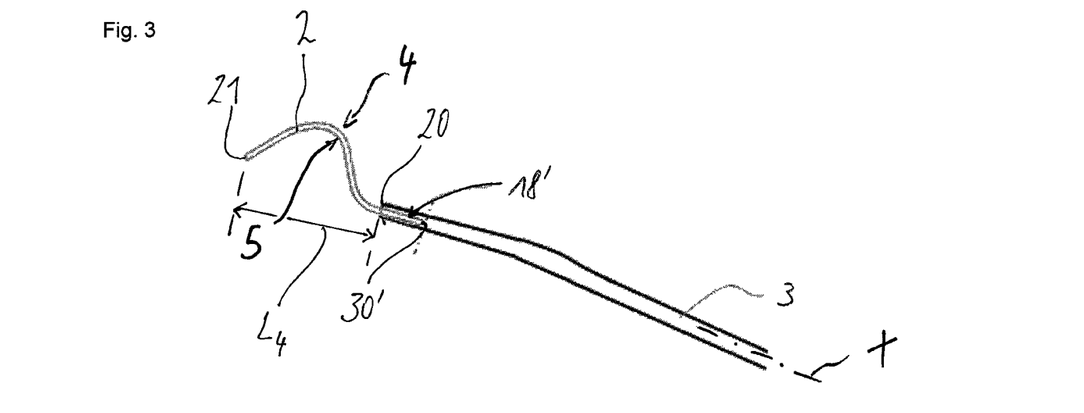
FIG. 3 shows the B-pillar in a cross-sectional view along line III-III shown in FIG. 1.

The sheet metal formed part 2 is configured as a continuous sheet metal formed part, which forms the metallic base body of the B-pillar 1. To connect the B-pillar 1 to the roof area of the vehicle body, the sheet metal formed part 2 comprises an upper metal portion 4. FIG. 3 shows that the upper metal portion 4 comprises a flange-like upper connecting region 5 with an approximately U-shaped profile in a longitudinal sectional view through the B-pillar 1, in order to embrace the roof area, for instance a roof spar, from the outside when the B-pillar 1 is in the built-in condition. FIGS. 1 and 2 show that sheet metal formed part 2 comprises a lower metal portion 6 to connect to the sill area of the vehicle body. The lower metal portion 6 comprises a lower connecting region 7 which, when built-in, can encompass the sill area from the outside or can be plugged into the sill. A central region 8 extends between the upper metal portion 4 and the lower metal portion 6. The central region 8 is configured to lateral connect with adjacent components, such as a door seal, a glass surface, an outer vehicle skin 9 displayed in a simplified manner in FIG. 9, or the like. A length La of the upper metal portion 4 is less than or equal to 15% of the length $L_1$ of the B-pillar 1, here about 12% of the length $L_1$. A length $L_6$ of the lower metal portion 6 is less than or equal to 25% of the length $L_1$ of the B-pillar 1, here about 20% of the length $L_1$.

Furthermore, at least between the upper connecting region 5 and the lower connecting region 7, the sheet metal formed part 2 comprises, in a cross-sectional view through the B-pillar 1, a hat-shaped profile which comprises a cavity 10 for receiving vehicle attachments on a vehicle interior side of the B-pillar 1 facing a passenger compartment. For this, the sheet metal formed part 2 comprises a centrally arranged central web 11, two laterally adjacent side webs 12 and two radially outer joining flanges 13 adjacent to the side webs 12. The sheet metal formed part 2 comprises, at least, in the central web 11 an upper recess 14 and a lower recess 15, whereby at least one of the recesses 14, 15 can extend across at least a part of the side webs 12. The upper recess 14 may be formed, at least in sections, in the upper metal portion 4 and in the central region 8. The upper recess 14 can extend over at least 0.25 times the length $L_1$ of the B-pillar 1, here about 40% to 45% of the length $L_1$. The lower recess 15 may be formed in the lower area of the central region 8 and, at least in sections, in the lower metal portion 6. The lower recess 15 can extend over about 0.1 times the length $L_1$ of the B-pillar 1, here about 10% of the length $L_1$. Between the two recesses 14, 15, the central web 11 comprises a holding area 16 to which at least some of the vehicle attachments, for example a hinge body 17 of a rear door of the vehicle body hinged to the B-pillar 1 can be attached. The fasteners used for said attachment of the vehicle attachments can be for example screws or rivets and can be used in addition to provide a form-fit and force-fit connection between the sheet metal formed part 2 and the fiber composite component 3.

The fiber composite component 3 substitutes the sheet metal shaped part 2 in the area of the recesses 14, 15, which are formed at least essentially along the central web 11 of the sheet metal formed part 2. Thus, an outer side of the B-pillar 1 facing away from a passenger compartment is formed by the fiber composite component 3, at least in a central region of the B-pillar 1. By this the fiber composite component 3 is at least partially positioned on the pressure side of the B-pillar. In order to bond the fiber composite component 3 permanently to the sheet metal formed part 2 and to integrate the fiber composite component 3 as a load-bearing structural component in the B-pillar, the sheet metal formed part 2 comprises the regions for force introduction 18 which are embedded into the matrix of the fiber composite material from which the fiber composite component 3 is made. Areas of the central web 11 and/or the side webs 12 are also embedded into the fiber composite component 3 so that the fiber composite component 3 is also integrated into the force flow of the B-pillar 1 also.

The upper metal portion 4 comprises the upper region for force introduction 18', which ends with an upper end edge 30', which axially limits the upper recess 14 upwards, as shown in FIG. 3. The lower metal portion 6 comprises a lower region for force introduction 18" axially spaced from the upper region for force introduction 18' with a lower end edge 30", which axially limits the lower recess 15 downwards. The fiber composite component 3 extends with an upper end portion 19' beyond the upper end edge 30' into the upper region for force introduction 18 and with a lower end portion 19" beyond the lower end edge 30" into the lower region for force introduction 18, so that the upper region for force introduction 18' and the lower region for force introduction 18" are embedded into the fiber composite component 3. FIG. 2 shows that a distance $L_{30}$ between the upper edge 30' and the lower edge 30" can be at least 25% and at most 95% of the total length $L_1$ of the B-pillar 1 and here is about 60%.

Figure 4:
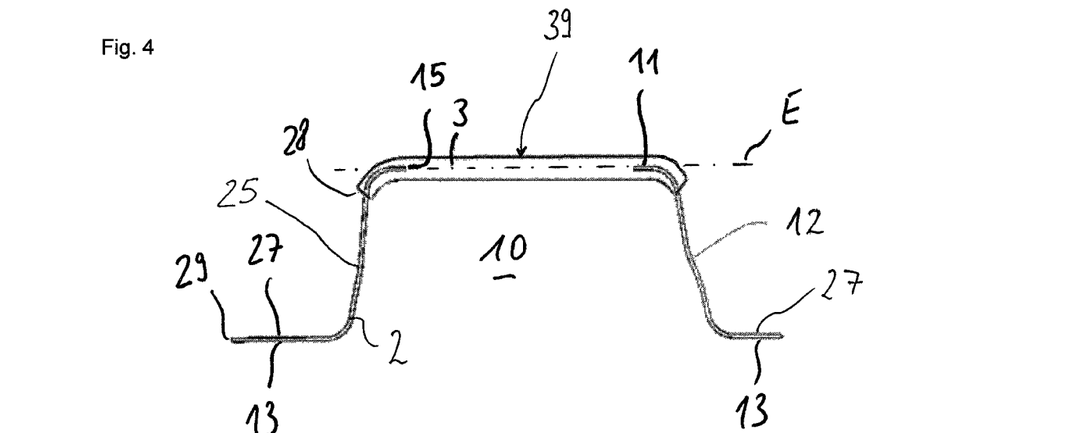
FIG. 4 shows the B-pillar in a cross-sectional view along line IV-IV shown in FIG. 1.
Figure 5:
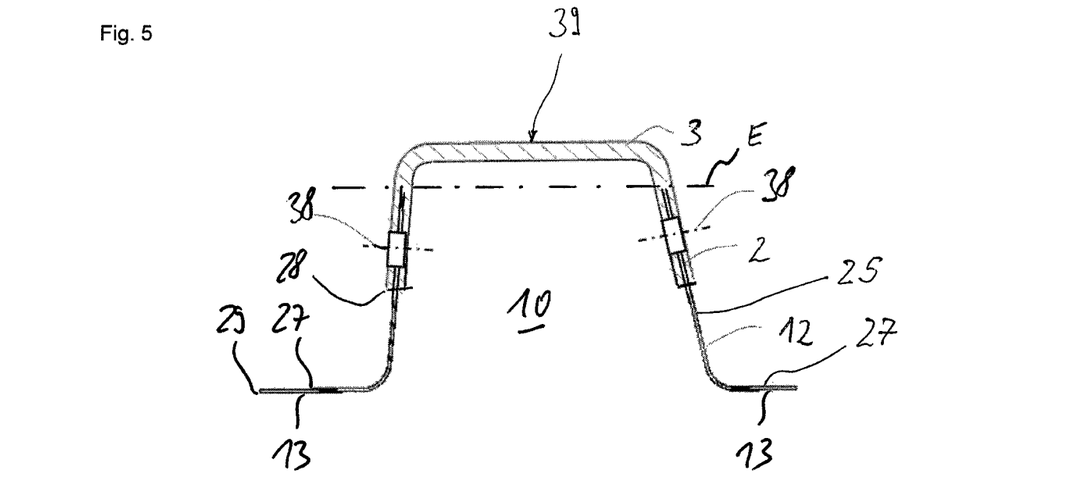
FIG. 5 shows the B-pillar in a cross-sectional view along line V-V shown in FIG. 1.
Figure 6:
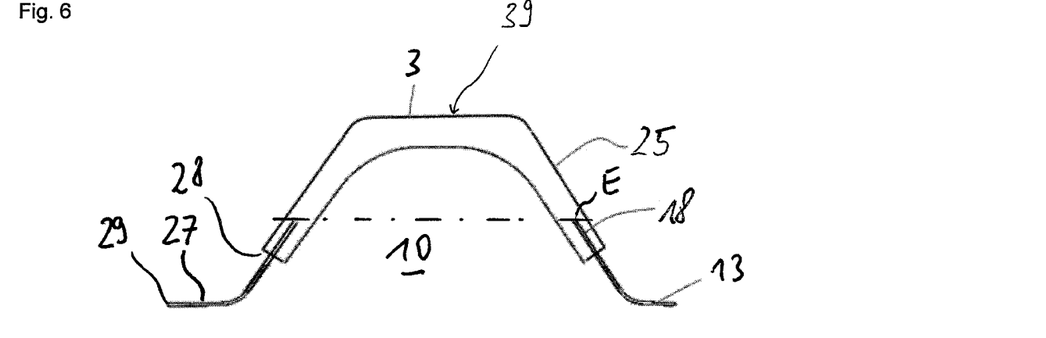
FIG. 6 shows the B-pillar in a cross-sectional view along line VI-VI shown in FIG. 1.
Figure 7:
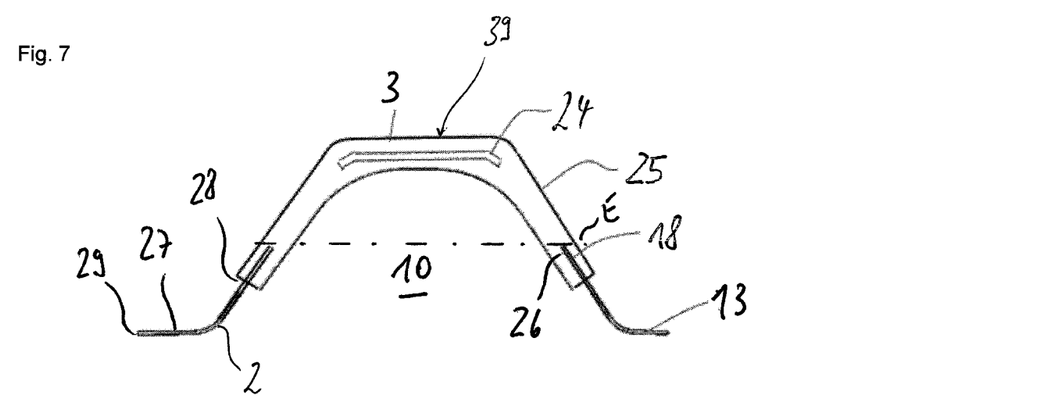
FIG. 7 shows the B-pillar with a reinforcing insert in a cross-sectional view along line VI-VI shown in FIG. 1.
Figures 8, 9:
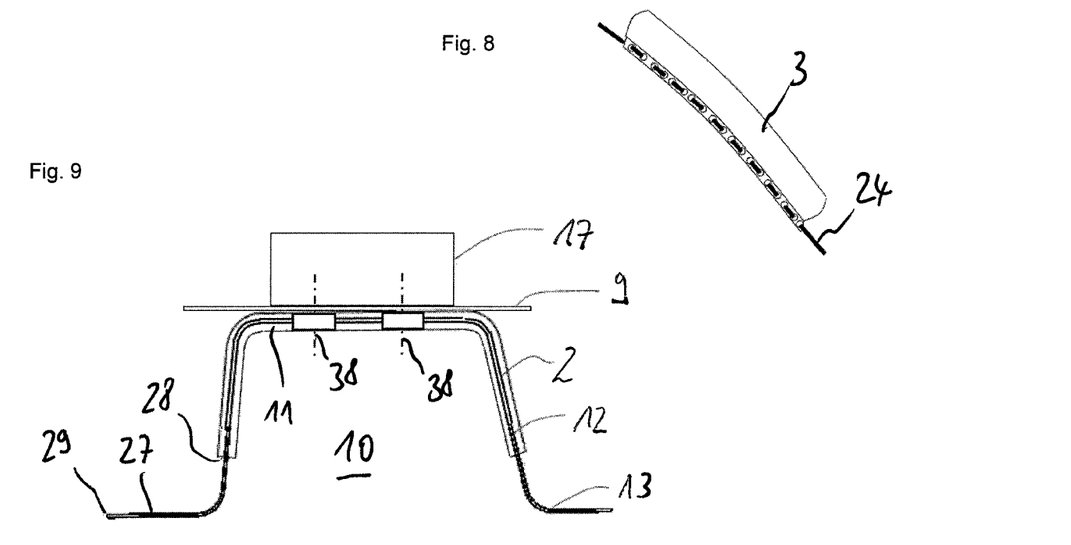
FIG. 8 shows a partial section of the reinforcing insert from FIG. 7.
FIG. 9 shows the B-pillar in a cross-sectional view along line IX-IX shown in FIG. 1, whereby the B-pillar is shown in simplified form in its built-in condition.

FIG. 4 shows a cross-sectional view through the B-pillar 1 along line IV-IV shown in FIG. 1, intersecting the lower recess 15. It can be seen that the lower recess 15 is formed within the central web 11 of the sheet metal formed part 2, so that a central leg 39 of the B-pillar 1, in the section shown here, is formed from the fiber composite material of the fiber composite component 3 and the metal of the sheet metal formed part 2. FIGS. 5 to 7 show further cross-sectional views through B-pillar 1, along corresponding lines as displayed in FIG. 1. It can be seen that the recess, here the upper recess 14, can extend both over the central web 11 and over the side webs 12 of the sheet metal formed part 2. Thus, the central leg 39 of the B-pillar 1, and also side walls 25 of the B-pillar 1, can, at least in sections, be made of the fiber composite material of the fiber composite component 3. The regions for force introduction 18, in a sectional view through B-pillar 1, are completely embedded into the fiber composite component 3, so that the sheet metal formed part 2 is permanently connected to the fiber composite component 3. FIG. 9 also shows a cross-section view through the B-pillar 1 in the region of the holding area 16. It can be seen that the central web 11 of the sheet metal formed part 2 is completely embedded into the fiber composite component 3 along the holding area 16, in a sectional view through the B-pillar 1.

Thus, the fiber composite component 3 completely covers the recesses 14, 15, respectively fills them. Correspondingly, the central leg 39 of the B-pillar 1, which comprises a hat-shaped profile, at least in sections, is formed at least substantially from the fiber composite material of the fiber composite component 3. The fiber composite component 3 extends continuously across both the upper recess 14 and the lower recess 15, and, hence, is not interrupted. Furthermore, the shape of the at least substantially U-shaped fiber composite component 3, at least in sections, follows the hat profile of the sheet metal formed part 2. Thus, the fiber composite component 3 is at least substantially U-shaped and delimits the open cavity 10 on one side. FIG. 1 shows that the fiber composite component 3 extends across at least 0.25 times the length $L_1$ of the B-pillar 1, for instance about 70% of the length $L_1$. An upper end 20 of the fiber composite component 3 is spaced from an upper end 21 of the B-pillar 1 or sheet metal formed part 2, respectively, at a distance of about 5% of the length $L_1$. A lower end 22 of the fiber composite component 3 is spaced from a lower end 23 of the B-pillar 1 or the sheet metal formed part 2, respectively, at a distance of about 20 to 25% of the length $L_1$.

To provide a B-pillar 1 with a high-strength middle area, which is of particular relevance for the protection of the vehicle passengers, the fiber composite component 3 can optionally have at least one reinforcing insert or metallic insert 24, respectively. The reinforcing insert 24 is shown in FIGS. 7 and 8, where in FIG. 6 the B-pillar 1 is shown without such a reinforcing insert.

FIG. 8 shows that the reinforcing insert 24 can be integrated into the laying structure of the surrounding fibers by weaving 6 a subset of the fibers into the reinforcing insert 24 in a form-locking or load-bearing manner during the manufacture of the fiber composite component 3. Due to its surface properties or roughness, respectively, and/or a defined surface coating concept, the reinforcing insert 24 can be integrated into the matrix surrounding the fibers of the fiber composite material in a load-bearing manner. The reinforcing insert 24 can be made of high strength, higher strength or ultra high strength being cold or hot formed steel, depending on the customer's crash behavior requirements. Furthermore, the reinforcing insert 24 can have a variable wall thickness. In cross-sectional view as shown in FIG. 7, it can be seen that the reinforcing insert 24 can have a roughly U-shaped or dish-shaped profile. In some aspects of the present disclosure the reinforcing insert 24 also can either be configured narrower, for instance strip-shaped, or significantly wider, so that the reinforcing insert 24 can also extend significantly deeper into the side walls 25 of B-pillar 1, provided that the side walls 25 are formed by the fiber composite component 3.

A barrier or decoupling layer 26, for example made of an adhesive, is provided between the fiber composite component 3 and the force introduction regions 18 of the shaped sheet metal part 2, respectively, to prevent contact corrosion between the components, namely the sheet metal formed part 2 and the fiber composite component 3. The barrier or decoupling layer 26 can also be provided between the fiber composite component 3 and the at least one reinforcing insert 24 or other metallic components integrated in the fiber composite component 3.

The ready-to-use B-pillar 1, shown in FIG. 1, comprises a single-layered flange section 27 on each side. In these regions, the joining flanges 16 of the sheet metal formed part 2 are not covered by the fiber composite component 3, so that the B-pillar 1 in the built-in condition is only connected to adjacent components, such as the outer vehicle skin 9 and/or a door seal and/or a glass surface, via the sheet metal formed part 2. In more detail, a side edge 28 of the fiber composite component 3 is spaced from a side edge 29 of the sheet metal shaped part 2 such that, between the side edge 28 of the fiber composite component 3 and the side edge 29 of the sheet metal formed part 2 the sheet metal formed part 2 comprises the single-layered flange section 27 to connect adjacent components to the B-pillar 1.

To manufacture the B-pillar 1 having a hybrid design, the fiber composite material can, for example, be placed in a laying mold, whereby the regions for force introduction 18 of the sheet metal formed part 2 are embedded into the matrix of the fiber composite material. In this way, the sheet metal formed part 2 can, for example, be bonded inseparably to the fiber composite component 3 by lamination or fiber injection, pressing or injection processes. After hardening or solidification of the matrix, the fiber composite component 3 is permanently connected to the sheet metal formed part 2. Thus, the fiber composite component 3 is structurally load-bearingly integrated into the hybrid B-pillar 1, so that the main load of the B-pillar 1 in the area of the two recesses 14, 15 is taken up by the fiber composite component 3.

Figure 10:
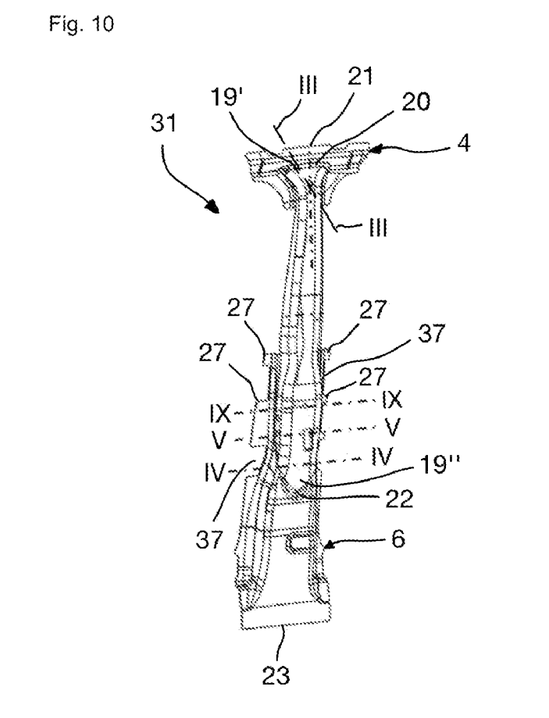
FIG. 10 shows a B-pillar according to a second example in a perspective view.
Figure 11:
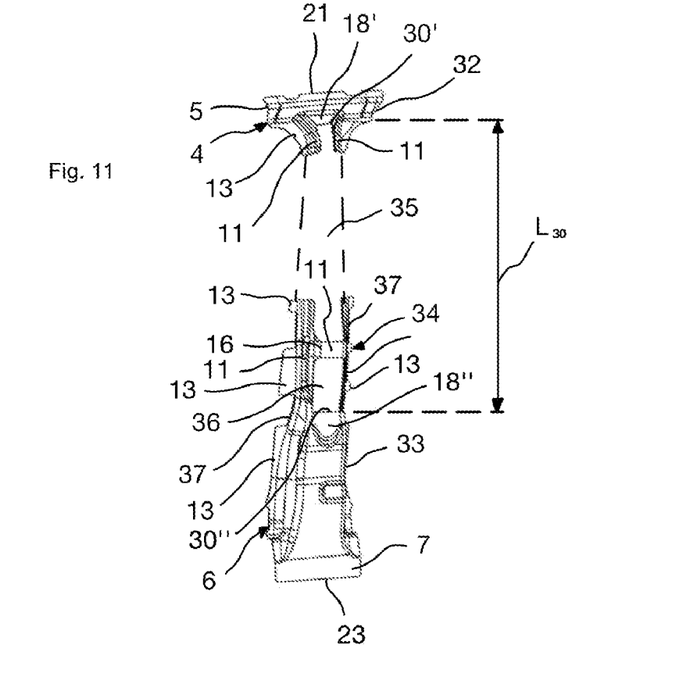
FIG. 11 shows a sheet metal formed part of the B-pillar from FIG. 1 in a perspective view.

FIGS. 10 and 11 show a B-pillar 31 according to a further example, which corresponds as far as possible to the examples described above in connection with FIGS. 1 to 9, so that reference is made to the description described above with regard to similarities. The same or modified details are provided with the same reference signs as in FIGS. 1 to 9. The main difference lies the integration of the upper metal portion and the lower metal portion into the fiber composite component 3.

FIG. 10 shows the B-pillar 31 in a ready-to-use condition, and FIG. 11 shows the B-pillar 31 in an unfinished condition before the fiber composite is applied to an upper sheet metal formed part 32 and a lower sheet metal formed part 33. The two sheet metal formed parts 32, 33 are axially spaced from each other and are connected to each other solely via the fiber composite component 3. The upper sheet metal formed part 32 comprises the upper metal portion 4 and the lower sheet metal formed part 33 comprises the lower metal portion 6 as well as a functional portion 34 to connect vehicle attachments to the B-pillar 31.

FIG. 11 shows in more detail that the B-pillar 31 comprises an upper recess 35 and a lower recess 36 which are covered or filled by the fiber composite component 3. The upper recess 35 is arranged between the two sheet metal formed parts 32 and 33 and can extend across about 0.2 to 0.6 times the length $L_1$ of the B-pillar 31, here about 30% of the length $L_1$. The upper recess 35 extends into both the upper sheet metal formed part 32 and the lower sheet metal formed part 33. The lower recess 36 is formed within the lower sheet metal formed part 33 and can extend across about 0.1 to 0.3 times the length $L_1$ of the B-pillar 1, here about 10% of the length $L_1$.

To provide the permanent connection with the fiber composite component 3 both sheet metal formed parts 32, 33 comprise the regions for force introduction 18', 18" that are completely embedded into the fiber composite component 3 in a sectionally view through the B-pillar 31. The regions for force introduction 18', 18" of the upper and lower sheet metal formed parts 32, 33 each enclose the upper recess 35 in a U-shape. The end edge 30' at the upper sheet metal formed part 32 limits the upper recess 35 axially upwards, and the lower end edge 30" of the lower sheet metal formed part 33 limits the lower recess 36 axially downwards. The distance $L_{30}$ between the top edge 30' and the bottom edge 30" may be at least 25% and at most 95% of the total length $L_1$ of the B-pillar 1 and is, here, approximately 60%.

Between the two recesses 35, 36, the lower sheet metal formed part 33 in the region of the central web 11 comprises the holding area 16 to which at least some of the vehicle add-on parts, for example the hinge body 17 shown in FIG. 9, can be attached. Fasteners 38 used for this purpose, for example screws or rivets, can be used in addition to provide a form-fit and force-fit connection between the lower sheet metal formed part 33 and the fiber composite component 3.

For further weight reduction, the joining flange 13 may comprise recesses 37 in defined areas where no connection to components adjacent to the B-pillar 31 is required.

REFERENCE NUMERALS

1 B-pillar
2 sheet metal formed part
3 fiber composite component
4 upper metal portion
5 connecting region
6 lower metal portion
7 connecting region
8 central region
9 outer vehicle skin
10 cavity
11 central web
12 side web
13 joining flange
14 recess
15 recess
16 holding area
17 hinge body
18 region for force introduction
19 end region
20 end
21 end
22 end
23 end
24 reinforcing insert
25 sidewall
26 decoupling layer
27 flange section
28 side edge
29 side edge
30 end edge
31 B-pillar
32 sheet metal formed part
33 sheet metal formed part
34 functional portion
35 Recess
36 Recess
37 Recess
38 connection means
39 leg
E plane
L1 length
L4 length
L6 length L30 gap X longitudinal axis

The invention claimed is:

1. A B-pillar for a motor vehicle body, wherein the B-pillar extends along a longitudinal axis (X), the B-pillar comprising:
   an upper metal portion for connecting the B-pillar to a roof area of the motor vehicle body and a lower metal portion for connecting the B-pillar to a sill area of the motor vehicle body; and
   a fiber composite component comprising fibers and a plastic matrix;
   wherein the upper metal portion comprises an upper region for force introduction, and the lower metal portion comprises a lower region for force introduction axially spaced from the upper region for force introduction, the upper region for force introduction and the lower region for force introduction being embedded into the fiber composite component.

2. The B-pillar according to claim 1, wherein the fiber composite component is formed as an integral component.

3. The B-pillar according to claim 1, wherein the fiber composite component extends across at least 0.25 times a total length of the B-pillar.

4. The B-pillar according to claim 1, wherein the upper metal portion comprises an upper end edge, and the lower metal portion comprises a lower end edge, wherein the fiber composite component extends with an upper end region across the upper end edge into the upper region for force introduction and extends with a lower end region across the lower end edge into the lower region for force introduction.

5. The B-pillar according to claim 4, wherein a distance between the upper end edge and the lower end edge is at least 25% and at most 95% of the total length of the B-pillar.

6. The B-pillar according to claim 1, wherein at least one of a lower end of the fiber composite component is spaced from a lower end of the B-pillar at a distance of at least 10 centimeters (cm) or an upper end of the fiber composite component is spaced from an upper end of the B-pillar at a distance of at least 5 cm.

7. The B-pillar according to claim 1, wherein the upper metal portion comprises, at least partially, at least one lateral joining flange for connecting components adjacent to the B-pillar to the B-pillar, wherein the at least one lateral joining flange laterally projects beyond the fiber composite component.

8. The B-pillar according to claim 1, wherein the lower metal portion comprises, at least partially, at least one lateral joining flange for connecting components adjacent to the B-pillar to the B-pillar, wherein the at least one lateral joining flange laterally projects beyond the fiber composite component.

9. The B-pillar according to claim 1, wherein the upper metal portion and the lower metal portion comprise, at least partially, at least one lateral joining flange for connecting components adjacent to the B-pillar to the B-pillar, wherein the at least one lateral joining flange laterally projects beyond the fiber composite component.

10. The B-pillar according to claim 1, wherein
    the upper metal portion and the lower metal portion are formed by separate sheet metal formed parts which are spaced from each other; and
    the upper metal portion and the lower metal portion are joined to one another via the fiber composite component.

11. The B-pillar according to claim 4, further comprising a sheet metal formed part extending along the longitudinal axis of the B-pillar and comprising the upper metal portion and the lower metal portion, wherein between the upper end edge of the upper region for force introduction and the lower end edge of the lower region for force introduction, the sheet metal formed part comprises at least one recess which is at least partially filled by the fiber composite component.

12. The B-pillar according to claim 1, wherein between the upper region for force introduction and the lower region for force introduction, the B-pillar is at least partially U-shaped such that a cavity is formed on a vehicle interior side of the B-pillar for receiving vehicle add-on parts.

13. The B-pillar according to claim 1, further comprising at least one metallic reinforcing insert being embedded into the fiber composite component for local reinforcement of the B-pillar.

14. The B-pillar according to claim 1, wherein at least one of the upper metal portion or the lower metal portion comprises a variable wall thickness over the length of the B-pillar.

15. The B-pillar according to claim 1, wherein the upper metal portion comprises a variable wall thickness over the length of the B-pillar.

16. The B-pillar according to claim 1, wherein the lower metal portion comprises a variable wall thickness over the length of the B-pillar.

17. A motor vehicle body comprising two B-pillars, wherein the two B-pillars each extend along a longitudinal axis (X) and comprise:
    an upper metal portion for connecting the respective B-pillar to a roof area of the motor vehicle body and a lower metal portion for connecting the respective B-pillar to a sill area of the motor vehicle body; and
    a fiber composite component comprising fibers and a plastic matrix;
    wherein the upper metal portion comprises an upper region for force introduction, and the lower metal portion comprises a lower region for force introduction axially spaced from the upper region for force introduction, the upper region for force introduction and the lower region for force introduction being embedded into the fiber composite component.

\* \* \* \* \*